US008685884B2

(12) United States Patent
Green et al.

(10) Patent No.: US 8,685,884 B2
(45) Date of Patent: Apr. 1, 2014

(54) PRODUCTION OF MULTIFUNCTIONAL GRANULAR MEDIUM BY PARTIAL ACTIVATION OF PARTIALLY DECOMPOSED ORGANIC MATTER

(75) Inventors: Douglas A. Green, Brainerd, MN (US); Eric Ingwer Paulson, Aitkin, MN (US)

(73) Assignee: American Peat Technology, LLC, Aitkin, MN (US)

( * ) Notice: Subject to any disclaimer, the term of this patent is extended or adjusted under 35 U.S.C. 154(b) by 0 days.

(21) Appl. No.: 13/533,067

(22) Filed: Jun. 26, 2012

(65) Prior Publication Data

US 2012/0267569 A1    Oct. 25, 2012

Related U.S. Application Data

(63) Continuation of application No. 11/331,810, filed on Jan. 13, 2006, now Pat. No. 8,232,225.

(51) Int. Cl.
*C01B 31/16* (2006.01)
*B01D 15/04* (2006.01)
*C02F 1/42* (2006.01)

(52) U.S. Cl.
USPC ........... 502/418; 210/660; 252/179; 252/184; 502/430; 502/432; 502/437

(58) Field of Classification Search
USPC ........... 502/400, 38, 416, 418, 430, 437, 432; 210/660; 252/179, 178
See application file for complete search history.

(56) References Cited

U.S. PATENT DOCUMENTS

| | | | |
|---|---|---|---|
| 2,008,145 A | 7/1935 | Morrell | |
| 2,312,449 A | 3/1943 | Shoemaker | |
| 3,307,934 A * | 3/1967 | Wilson et al. | 71/24 |
| 3,969,268 A | 7/1976 | Fukuda et al. | |
| 4,014,817 A | 3/1977 | Johnson et al. | |
| 4,040,990 A | 8/1977 | Neely | |
| 4,064,043 A | 12/1977 | Kollman | |
| 4,265,768 A | 5/1981 | Beasley et al. | |
| 4,425,256 A | 1/1984 | Pilippski | |
| 4,616,001 A | 10/1986 | Sato | |
| 4,760,046 A | 7/1988 | Burger et al. | |
| 4,775,302 A * | 10/1988 | Neward | 417/440 |
| 4,778,602 A | 10/1988 | Allen, III | |
| 4,839,331 A | 6/1989 | Maroldo et al. | |
| 4,861,481 A * | 8/1989 | Allen, III | 210/502.1 |
| 5,039,651 A | 8/1991 | Kosaka et al. | |
| 5,102,855 A | 4/1992 | Greinke et al. | |
| 5,162,286 A | 11/1992 | MacDowall | |
| 5,314,638 A * | 5/1994 | Morine et al. | 252/184 |
| 5,416,056 A | 5/1995 | Baker | |
| 5,578,547 A * | 11/1996 | Summers et al. | 502/407 |
| 5,614,459 A | 3/1997 | Mondragon et al. | |
| 5,907,037 A | 5/1999 | Gujral et al. | |
| 5,977,016 A | 11/1999 | Von Blucher et al. | |
| 6,042,743 A | 3/2000 | Clemenson | |
| 6,184,177 B1 | 2/2001 | Von Blucher et al. | |
| 6,287,496 B1 | 9/2001 | Lownds | |
| 6,316,378 B1 * | 11/2001 | Giebelhausen et al. | 502/10 |
| 6,329,316 B1 | 12/2001 | Ogasa et al. | |
| 6,429,171 B1 * | 8/2002 | Clemenson | 502/404 |
| 6,455,149 B1 * | 9/2002 | Hagen et al. | 428/323 |
| 6,517,906 B1 | 2/2003 | Economy et al. | |
| 6,537,947 B1 | 3/2003 | Johns et al. | |
| 6,569,910 B1 | 5/2003 | Spindler et al. | |
| 6,765,027 B2 | 7/2004 | Holdcroft et al. | |
| 8,232,225 B2 * | 7/2012 | Green et al. | 502/418 |
| 2003/0041734 A1 * | 3/2003 | Funke et al. | 96/108 |
| 2004/0097369 A1 | 5/2004 | Freel et al. | |
| 2005/0075236 A1 | 4/2005 | Ramme et al. | |

FOREIGN PATENT DOCUMENTS

| | | |
|---|---|---|
| JP | 11222592 | 8/1999 |
| RU | SU806615 | 2/1981 |
| RU | SU1142160 | 2/1985 |
| RU | 2116128 | 7/1998 |
| RU | 2173578 | 9/2001 |

OTHER PUBLICATIONS

Durusoy et al. "Pyrolysis kinetics of Blends of Gediz Lignite with Denizli Peat" 2001, Energy Sources, 23, 393-399.*
Jones "The oxidation of Peat and its Thermal Accompaniment" J.Chem.Tech.Biotechnol, 1989, 45, 223-229.*
"Developing National Capability for Manufacture of Activated Carbon from Agricultural Wastes" Dr. R.B. Lartey et al., The Ghana Engineer, May 1999 (5 pages).

* cited by examiner

*Primary Examiner* — Wayne Langel
*Assistant Examiner* — Syed Iqbal
(74) *Attorney, Agent, or Firm* — Moss & Barnett

(57) ABSTRACT

A process for the production of low-temperature activated or partially activated partially decomposed organic matter for use as an ion-exchange medium comprising the steps of granulating partially decomposed moisture-bearing organic matter, drying the granules and activating the granules at a temperature of about 175-520° C., wherein the granule has a hardness and cation-exchange capacity suitable for a particular application desired.

26 Claims, No Drawings

PRODUCTION OF MULTIFUNCTIONAL GRANULAR MEDIUM BY PARTIAL ACTIVATION OF PARTIALLY DECOMPOSED ORGANIC MATTER

FIELD OF THE INVENTION

This invention relates generally to production of a partially physically activated granular media for use in ion-exchange processes, and more particularly, to production of activated carbon media using natural organic materials as sources.

BACKGROUND OF THE INVENTION

Ion exchange is generally defined as a reversible chemical reaction in which ions are exchanged between a solution and an insoluble solid. More specifically, it is a type of filtration in which an ionized compound or element changes place with another ionized compound or element on the surface of a medium. The term "ion-exchange capacity" describes the total available exchange capacity of an ion-exchange medium, as described by the number of functional groups on it.

The process of ion exchange is useful over a broad range of applications, and may generally be categorized as either anion or cation exchange. Ion exchange is most frequently used to achieve high-purity water (including softening, deionizing, water recycling, and heavy metals removal and recovery from wastewater) and in chemical-related processing. Ion-exchange media are also useful in chromatography, catalysis, electrochemical processes, the creation of super acids and super bases, and for the separation, concentration and/or purification of ionic species, pharmaceutical separations technology, the treatment of radioactive waste, sugar refining, etc. These materials take a variety of forms, including naturally occurring ion exchangers, synthetic ion exchangers, composite ion exchangers, and ion-exchange membranes.

Most typically, ion-exchange resins are used. The most common form of an ion-exchange resin is a synthetic insoluble matrix of styrene and divinylbenzene copolymers cross-linked to form beads between 0.03-1.0 mm. The beads must be activated to function as ion-exchange material. The beads can be converted to cation-exchange resins through sulfonation or anion-exchange resins through chloromethylation. Ion-exchange resins are capable of removing heavy metals, such as lead and mercury, from solution and replacing them with less harmful elements such as potassium or sodium. The process for the production of these resins is expensive. The product resin beads are also susceptible to fouling due to organic contaminants in the water flow. This necessitates the use of activated carbon or other removal technologies prior to ion-exchange treatment, only further complicating the process and adding to the cost.

Developmental approaches to the production of an activated carbon media involve using natural organic materials as a source. Examples of such organic materials include a variety of vegetable materials, softwoods, cornstalks, bagasse, nut hulls and shells, various animal products, lignite, bituminous coal, straw, anthracite and peat. These processes have largely focused on either chemical activation (e.g., sulfonation or chloromethylation) or full physical activation of the starting material at high temperatures. It is known in the art to convert sources such as sawdust, wood, or peat into an adsorber by chemical activation. For example, peat is impregnated with a strong dehydrating agent, such as phosphoric acid or zinc chloride, mixed into paste and then heated to a temperature of 500-800° C. to activate the peat. The product is then washed, dried and ground to a powder. In such a process, the resultant product generally exhibits a very open, porous structure that is ideal for adsorption of large molecules. Additionally, a process of steam activation, also known as physical activation, is typically employed with sources such as coconut shell and bamboo. The starting material is often activated by exposure to steam or carbon dioxide at high temperatures. Temperatures that have been used in the art include about 650-1200° C. These processes do not produce a media with a usable ion-exchange capacity.

One of the most significant challenges in producing an ion-exchange medium from natural, organic constituents is achieving a balance between the physical integrity of the form of the ion-exchange medium and the ability of the medium to serve as an ion-exchanger. The source of the starting material and the method of producing a medium from the precursor are the two most important variables determining the usefulness of the final product as an ion-exchange medium. Importantly, the process used to activate or partially activate the organic material will also determine the hardness of the resultant granule and its ability to function as an ion-exchange medium.

One significant disadvantage of the prior art is related to the resultant medium's capacity to function as an ion-exchange medium. Partially decomposed organic starting material inherently possesses ion-exchange characteristics; however, the material often loses its ion-exchange functionality during pyrolysis. Pyrolysis is simply the chemical decomposition of a substance by the exposure of extreme heat. Most natural organic ion exchangers tend to have weak physical structures making their application possibilities limited. Because the organic material is prone to crushing, it does not stand up to the often rigorous processes used in ion-exchange applications. Additionally, many known processes include the step of carbonization either prior to or concurrent with activation. Carbonization may cause considerable shrinkage and weight loss of the feedstock. Organic sources also generally have non-uniform physical properties. Naturally occurring organic ion exchangers are unstable outside a moderately neutral pH range. Finally, such organic ion exchangers tend to be prone to excessive swelling and peptizing.

Natural inorganic ion exchangers also have a number of disadvantages. They, too, tend to have relatively low ion-exchange capacities. Like natural organic ion exchangers, natural inorganic ion exchangers tend to have low mechanical durability. Because they are prone to degradation when exposed to certain chemicals in solution, such as oxidizing agents, it may be necessary to pretreat natural inorganic ion exchangers.

The use of synthetic organic ion-exchange resins similarly has disadvantages. Importantly, resins generally have the disadvantage of foulant formation on the resin beads. Ion-exchange material removes some soluble organic acids and bases while other non-ionic organics, oils, greases, and suspended solids remain on the surface of the resin. This process is known as fouling. Foulants can form rapidly and can significantly hinder performance of the system. Cationic polymers and other high molecular weight cationic organics are particularly troublesome at any concentration. For certain types of resins, even 1 ppm suspended solids can cause significant fouling over time. As such, prefiltration upstream of the ion exchange might be required to remove elements, such as colloidal silica, iron, copper, and manganese that can cause fouling of the resin. As organic contaminants begin to build up on the surface of a resin, the flow of other particles and bacteria is also diminished. The costs of pretreatment can be significant.

Additionally, resins require regeneration once the ion-exchange sites have been exhausted, for example, as feedwater flows through a bed. During regeneration of a cation resin, cations that were previously removed are replaced with hydrogen ions. A step known as "backwash" is often employed during regeneration so that any organic contaminant build-up in the resin can be relieved allowing free flow through the resin. Chemically regenerated ion-exchange processes known in the art use excessive amounts of regeneration chemicals, require periodic and sometimes even ongoing treatment, and disposal of the chemical waste. The processes can be complex and expensive to operate. There is still a need for a process with decreased chemical requirements in the production of ion-exchange media.

While the processes known in the art for the preparation of ion-exchange material from natural solid organic material have been useful for certain ion-exchange applications, for particular applications it is necessary to increase the hardness of the resultant ion-exchange medium while minimally sacrificing the media's cation-exchange capacity in the process. It is necessary to develop a process for the low-cost production of an ion-exchange medium that has good ion-exchange capacity, organics adsorption capabilities, and improved strength such that the medium may be used in a wider range of applications.

The present invention is an improved process for the production of an ion-exchange medium which possesses increased physical integrity of the medium without compromising the natural cation-exchange capacity of the starting material.

This invention is related to a natural organic starting material, and in particular to the use of decomposed or partially decomposed organic matter. More specifically, a preferred starting material is peat or leaf compost material. Unlike other types of organic materials found in nature, peat is naturally partially carbonized. Because of this inherent characteristic, peat naturally possesses a cation-exchange capacity of approximately 120 meq/100 g. It has been discovered that much of the naturally occurring high cation-exchange capacity may be retained if the peat is subjected to either steam, carbon dioxide, nitrogen or other inert media at low activation temperatures in an inert environment.

In general, enhanced mechanical strength and dimensional stability have been achieved when decomposed or partially decomposed organic matter has been partially physically activated at low temperatures. The resultant medium will also possess enhanced organic contaminant retention capabilities when in wastewater. The present inventive process additionally has been found to decrease the amount of leaching into treated water from tannins that are naturally present in certain starting materials. These improvements in the process permit the resultant partially activated media to be used in a broader range of applications than those seen in the prior art.

As used herein, the following terms have the meanings given below, unless the context requires otherwise.

The term "mEq" means milliequivalents. The equivalent is a common unit of measurement used in chemistry and the biological sciences. It is a measure of a substance's ability to combine with other substances. The "equivalent" is defined as the mass in grams of a substance which will react with $6.022 \times 10^{23}$ electrons. Another way of defining an "equivalent" is the number of grams of a substance that will react with a gram of free hydrogen. The equivalent weight of a given substance is approximately equal to the amount of substance in moles, divided by the valence of the substance. Because, in practice, the equivalent weight is often very large, it is frequently described in terms of milliequivalents (mEq). A mEq is $\frac{1}{1000}$ of an equivalent.

The term "hardness" means a property of the granular medium's ability to resist attrition during handling and operation. The "hardness number" is a measure of this property and is determined by way of the "Ball-Pan Hardness" test. The higher the value, the less the losses in uses. A certain amount of material is put into a pan, together with some steel balls, and shaken for a defined period of time. The material is weighed before and after the shaking to determine the amount of attrition. The percent of original material that remains after shaking is the "hardness number."

The term "iodine number" means an equivalent to the surface area of activated carbon in mg/g. It is the most standard fundamental parameter used to characterize activated carbon materials performance.

The term "empty bed contact time" means the time required for a liquid in a carbon adsorption bed to pass through a carbon column, assuming all liquid passes through at the same velocity. It is equal to the volume of the empty bed divided by the flow rate.

The term "about" means approximately or nearly and in the context of a numerical value or range set forth herein means±2% of the numerical value or range recited or claimed.

The term "ug" means one microgram or one one-millionth of a gram or one one-thousandth of a milligram.

The term "ng" means nanograms or $1 \times 10^{-9}$ grams or 0.000000001 grams.

OBJECTS OF THE INVENTION

It is an object of this invention to provide a process for the production of ion-exchange media with a high degree of control over particle shape and composition.

Another object is to provide a process that yields an ion-exchange medium with improved resistance to particle crushing while retaining much of the natural ion-exchange capacity of the medium.

Another object is to provide a process that yields an ion-exchange medium with improved capability for adsorbing organic contaminants from water flow.

Another object is to provide a process for the production of ion-exchange media that eliminates the step of complete activation of the carbonaceous starting material.

Another object is to provide a process for the production of ion-exchange media that eliminates an additional step of pyrolysis or carbonization.

Still another object is to provide a process for the production of ion-exchange media that avoids friability of the particles.

Another object is to provide a process for the production of ion-exchange media through low-temperature activation or partial activation of partially decomposed organic matter.

Still another object is to provide a simpler and more economical process for the preparation of an ion-exchange medium.

Yet another object is to provide an improved process for the treatment of peat for its use as an ion-exchange medium in a myriad of applications.

Still another object is to provide ion-exchange media possessing useful cation-exchange capacity.

These and other objects of the invention will be apparent from the following descriptions.

SUMMARY OF THE INVENTION

A process for the production of a multifunctional granular medium is disclosed. Such process results in the formation of ion-exchange media of the type produced by low-temperature activated or partially activated partially decomposed organic matter.

In general, the process according to the invention comprises supplying an amount of partially decomposed moisture-bearing organic matter to a granulating machine, granulating the organic matter, drying the granules, and activating the granules at a temperature of about 175-520° C. wherein the granule has a hardness and a cation-exchange capacity (CEC) suitable for the desired application.

The organic matter may be screened to remove unwanted particles before granulating. Other constituents, such as binders, pH adjusters and reactive compounds may be added to the organic matter before granulation. In preferred embodiments, the granule temperature during the drying step is about 80-200° C.

Once the granules are dried, a particular size granule is selected depending upon the application for which it will be used. This step comprises screening granules of varying sizes. In highly preferred embodiments, after the granules are screened to select for a particular size, the chosen granules are activated by exposing them to steam or carbon dioxide, nitrogen or other inert media and combinations thereof at a temperature of about 175-520° C. Yet in another preferred embodiments, the chosen granules are activated by exposing them to steam or carbon dioxide, nitrogen or other inert media and combinations thereof at a temperature of about 230-480° C. In alternative embodiments, the granule is both dried and activated during the step of activation.

In highly preferred embodiments, the granules have a hardness of about 80-100% in the Ball-Pan Hardness test. In yet another preferred embodiment, the granules have a Ball-Pan Hardness number of about 80-98%.

The decomposed or partially decomposed organic matter to be used in the process for the production of ion-exchange material according to the invention may be compost media, livestock manure, sewage sludge, and combinations thereof. In preferred embodiments, the partially decomposed organic matter is compost media. Compost media may be leaf compost media, peat, plant by-products, and combinations thereof. In highly preferred embodiments, compost media is leaf compost media. It most highly preferred that compose media be peat.

DETAILED DESCRIPTION OF PREFERRED EMBODIMENTS

The low-cost process for the production of a multifunctional granular medium suitable for use as an ion-exchange media and characteristics of the media resulting from such process will now be discussed. Such process results in the formation of ion-exchange media of the type produced by low-temperature activated or partially activated partially decomposed organic matter. The preferred embodiments described herein are not intended to be exhaustive or to limit the invention to the precise form disclosed.

In general, the process according to the invention comprises supplying an amount of partially decomposed moisture-bearing organic matter to a granulating machine. More particularly, the moisture-bearing organic matter is peat or leaf compost media. The peat is granulated, dried and activated. The peat may contain unwanted particles and, as such, it may be necessary to screen such unwanted particles before granulating.

Other constituents, such as binders, pH adjusters and reactive compounds, may be added to the peat before granulation. In preferred embodiments, the granule temperature during the drying step is about 80-200° C.

Once the peat granules are dried, a particular size granule is selected depending upon the application for which it will later be used. The step of screening for a particular size comprises screening granules of varying sizes.

In highly preferred embodiments, after the granules are screened to select for a particular size, the chosen granules are activated by exposing them to steam or carbon dioxide, nitrogen or other inert media and combinations thereof at a temperature of about 175-520° C. In highly preferred embodiments, the chosen granules are activated by exposing them to steam or carbon dioxide, nitrogen or other inert media and combinations thereof at a temperature of about 230-480° C. In alternative embodiments, the granule is both dried and activated during the step of activation.

In highly preferred embodiments, the granules have a Ball-Pan Hardness number of about 75-100%. In yet another preferred embodiment, the granules have a Ball-Pan Hardness number of about 80-98%.

The decomposed or partially decomposed organic matter to be used in the process for the production of ion-exchange material according to the invention may be selected from the group consisting of compost media, livestock manure, sewage sludge, and combinations thereof. In highly preferred embodiments, the partially decomposed organic matter is compost media. Compost media is selected from the group consisting of peat, plant by-products, leaf compost, and combinations thereof. In an alternative embodiment, compost media is leaf compost media. It is most highly preferred that compost media be peat.

Compost media is any decayed organic matter. Plant by-products may include partially decomposed plants, leaves, stalks, and silage, for example. Livestock manure is the dung and urine of animals. Sewage sludge is solid, semi-solid or liquid residue generated by the processes of purification of municipal sewage. Each of the foregoing sources of decomposed or partially decomposed organic matter has innate ion-exchange capacity. The ion-exchange capacity inherent to each of these sources is significantly similar.

As demonstrated in the examples which follow, by employing a process of low-temperature activation of partially decomposed organic matter, the medium retains much of its inherent cation-exchange capacity, obtains an increased capacity for organic contaminants (and some other metals) in solution and has increased strength and durability when exposed to water. These characteristics make the media well-suited for waste water remediation.

EXAMPLES 1-4

Base Process

Exemplary multifunctional granular media were prepared. Each granular medium included peat. The peat selected was of a reed sedge type commercially available from American Peat Technology, Inc. of Aitkin, Minn.

For each of the Examples 1-4, the peat material was first dried to a moisture content of about 40%. Using a granulating machine, this material was then compressed and dried again to a moisture of about 6%. The resultant material was then crushed and sized to a range of about 10 to 30 mesh.

Observations with respect to activation temperatures, product yield, cation-exchange capacity, Ball-Pan Hardness number and Iodine numbers were made as noted in each example and in Table 1.

Example 1

A process for the production of a multifunctional granular medium by means of partial activation of peat was used. The peat was partially activated at 232° C. for about 30 minutes. The granular material achieved a maximum temperature of 212° C. with an outlet steam temperature in the reactor of 132° C. Two pounds of steam were used per pound of product produced. The yield of the product produced was 90% of the weight of the granular material input.

Example 4

A process for the production of a multifunctional granular medium by means of partial activation of peat was used. The peat was partially activated at 482° C. for about 30 minutes. The granular material achieved a maximum temperature of 454° C. with an outlet steam temperature of 273° C. Two pounds of steam were used per pound of product produced. The yield of product produced was 65% of the weight of granular material input.

The product from Example 4 had a cation-exchange capacity of 13 meq/100 g of $Cu^{2+}$. It also had a Ball-Pan Hardness number of 76.4%. The surface area was 304 mg/g as determined by the Iodine number.

TABLE 1

| Example | Activation temperature (° C.) | Maximum granule temperature (° C.) | Outlet temperature (° C.) | Product Yield (wt. %) | Cation-Exchange Capacity (meq/100 g) | Ball-Pan Hardness (%) | Iodine number (mg/g) |
|---|---|---|---|---|---|---|---|
| 1 | 232 | 212 | 132 | 90 | 120 | 88.6 | 198 |
| 2 | 287 | 260 | 162 | 90 | 92 | 96.9 | 123 |
| 3 | 343 | 326 | 182 | 80 | 68 | 97.3 | 178 |
| 4 | 482 | 454 | 273 | 65 | 13 | 76.4 | 304 |

The product from Example 1 had a cation-exchange capacity of 120 meq/100 g of $Cu^{2+}$. The Ball-Pan Hardness number was 88.6%. The surface area was 198 mg/g as determined by the Iodine number.

Example 2

A process for the production of a multifunctional granular medium by means of partial activation of peat was used. The peat was partially activated in an inert environment at 287° C. for about 30 minutes.

The granular material achieved a maximum temperature of 260° C. with an outlet steam temperature of 162° C. Two pounds of steam were used per pound of product produced. The yield of product produced was 90% of the weight of granular material input.

The product represented in Example 2 had a cation-exchange capacity of 92 meq/100 g of $Cu^{2+}$. The Ball-Pan Hardness number was 96.9%. The surface area was 123 mg/g as determined by the Iodine number.

Example 3

A process for the production of a multifunctional granular medium by means of partial activation of peat was used. The peat was partially activated at 343° C. for about 30 minutes. The granular material achieved a maximum temperature of 326° C. with an outlet steam temperature of 182° C. Two pounds of steam were used per pound of product produced. The yield of product produced was 80% of the weight of granular material input.

The product from Example 3 a cation-exchange capacity of 68 meq/100 g of $Cu^{2+}$. It also had a Ball-Pan Hardness number of 97.3%. The surface area was 178 mg/g as determined by the Iodine number.

It was observed for Examples 1-3 that the cation-exchange capacity and Ball-Pan Hardness numbers were within ranges satisfactory for use in ion-exchange applications. As the temperature of activation is increased to about 482° C. as seen in Example 4, the ion-exchange capacity is limited and the Iodine number is significantly higher. A higher Iodine number generally indicates a greater adsorptive capacity for organics. Therefore, though the ion-exchange capacity is somewhat compromised at the higher temperature of activation, a medium such as that seen in Example 4 with an Iodine number of 304 mg/g is better suited for use as an organic adsorption medium.

The data reveal that activation at temperatures at the lower end of the range produces a granular medium with a higher product yield and higher cation-exchange capacity than activation at higher temperatures within the range. It was observed that the Ball-Pan Hardness number hits its peak at the level of activation expressed in Examples 2 and 3. After that level of activation was reached, the internal bonds in the granule begin to break down causing an observed decrease in the hardness number. It was also observed that activation at points along the range produces a granular medium with a Ball-Pan Hardness number that is within satisfactory ranges for use as an ion-exchange material.

Example 5

A column of the material produced according to the process described in Example 2 was subjected to an industrialized wastewater containing mercury and other toxic metals in solution. The granular material in the size range of 10 to 30 mesh was placed in the column in the wetted state. The wastewater flow rate through the column was maintained at about a 10 minute empty bed contact time (EBCT). EBCT is the time it takes for the water to fill the volume of media in the column. Results of water analysis before and after granular contact are listed for a variety of metals, including mercury. These results were averaged over one week's time.

TABLE 2

| | Metal Ion Concentration | | | |
|---|---|---|---|---|
| | Mercury ng/L | Copper ug/L | Zinc ug/L | Nickel ug/L |
| Before granular contact | 9.3 | 45.2 | 95.6 | 136 |
| After granular contact | 2.5 | 10.8 | <50 | 31 |
| Percentage Removal | 73% | 76% | >48% | 77% |

The results for mercury and other toxic metals show the multifunctional granular medium by partial activation of partially decomposed organic matter as claimed is particularly well-suited for polishing wastewater flows with low concentrations of dissolved heavy metals in an economical manner. Due to the low EBCT and high overall cation-exchange capacity of the granules (CEC=92 meq/100 g), very little of this material is required to treat vast quantities of polluted waters. The high granular hardness (Ball-Pan Hardness=96.9%) is required to withstand water flow rates and long column residence times. All these factors coupled with the economy of the claimed process show the media is particularly well-suited for use in metals removal by ion exchange.

Examples 6-11

If examples 1-5 were followed using compost media, leaf compost media, sewage sludge, livestock manure, plant by-products, and combinations thereof instead of peat, it is believed that similar results would be obtained as those represented in Tables 1 and 2. It is expected that no significant modifications, if any, in the method disclosed in examples 1-5 would be required using these alternative sources of partially decomposed organic matter.

Compost media and peat are substantially similar starting materials; peat is a type of compost media. Other types of compost media, it is believed, would yield similar results. Both leaf compost media and plant by-products are also types of compost media. All of these sources of decomposed or partially decomposed organic matter possess naturally inherent ion-exchange capacity. As such, it is believed that using compost media, leaf compost media, plant by-products or combinations thereof as a source would yield similar results as if peat had been used as the starting material.

It is further believed that sewage sludge would also make a suitable starting material because it, too, possess substantially similar natural ion-exchange capacity. As such, it is expected that if examples 1-5 were followed using sewage sludge, similar results would be obtained.

Likewise, livestock manure possesses inherent ion-exchange capacity characteristics making it a suitable decomposed or partially decomposed organic matter for use as a starting material in the method disclosed in examples 1-5.

Finally, it is believed that any combinations of compost material, livestock manure, and sewage sludge would render results similar to those in Tables 1 and 2. The combination of such decomposed or partially decomposed starting materials is not expected to significantly alter the results of the method followed in examples 1-5.

It is believed that the invention has been described in such detail as to enable those skilled in the art to understand the same and it will be appreciated that variations may be made without departing from the spirit and scope of the invention. While the principles of the invention have been described in connection with specific embodiments, it should be understood that these descriptions are made only by way of example and are not intended to limit the scope of the invention.

The invention claimed is:

1. An ion exchange medium for use in association with the adsorption of heavy metals from waste water or aqueous solutions, comprising thermally activated granules of partially decomposed organic matter having a Ball-Pan Hardness number of about 75%-100%.

2. The ion exchange medium of claim 1 further comprising at least one additive admixed into the granule.

3. The ion exchange medium of claim 2, wherein the additive is selected from the group consisting of binders, pH adjusters, and combinations thereof.

4. The ion exchange medium of claim 1, wherein the thermally activated granule exhibits a predetermined size.

5. The ion exchange medium of claim 1, wherein the Ball-Pan Hardness number of the thermally activated granule is about 80-98%.

6. The ion exchange medium of claim 1, wherein the partially decomposed organic matter is selected from the group consisting of compost media, livestock manure, sewage sludge, and combinations thereof.

7. The ion exchange medium of claim 6, wherein the compost media is selected from the group consisting of leaf compost media, peat, plant by-products, and combinations thereof.

8. The ion exchange medium of claim 7, wherein the compost media is leaf compost media.

9. The ion exchange medium of claim 7, wherein the compost media is peat.

10. An ion exchange medium for use in association with the adsorption of heavy metals from waste water or aqueous solutions prepared from the process comprising the steps of:
    (a) supplying an amount of the partially decomposed moisture-bearing organic matter to a granulating machine;
    (b) granulating the partially decomposed organic matter;
    (c) drying the granules; and
    (d) thermally activating the granules without chemical activation using an activation heat medium at a temperature of about 175-287° C., wherein the granule has a Bali-Pan Hardness number of about 75%-100% and is suitable for the heavy metal adsorption end-use application.

11. The ion exchange medium of claim 10 further comprising screening the partially decomposed organic matter to remove unwanted particles before granulating.

12. The ion exchange medium of claim 10 further comprising admixing additives with the partially decomposed organic matter after screening.

13. The ion exchange medium of claim 12, wherein the additives are selected from the group consisting of binders, pH adjusters, and combinations thereof.

14. The ion exchange medium of claim 10, wherein the granule temperature during the drying step is conducted at a temperature of about 80-200° C.

15. The ion exchange medium of claim 10 further comprising the step of providing a granule size for the desired application.

16. The ion exchange medium of claim 15, wherein providing the granule size comprises screening granules of varying sizes.

17. The ion exchange medium of claim 10, wherein the granules are thermally activated in an inert environment.

18. The ion exchange medium of claim 10, wherein the activation heat medium comprises steam or carbon dioxide, nitrogen or other inert media, or combinations thereof at a temperature of about 175-287° C. until the desired level of hardness and activation is achieved.

19. The ion exchange medium of claim 10, wherein the activation heat medium comprises steam or carbon dioxide, nitrogen or other inert media, or combinations thereof at a temperature of about 230-287° C. until the desired level of hardness and activation is achieved.

20. The ion exchange medium of claim 10, wherein the granule is dried during the step of activation.

21. The ion exchange medium of claim 10, wherein the granule has a Ball-Pan Hardness of about 80-98%.

22. The ion exchange medium of claim 10, wherein the partially decomposed organic matter is selected from the group consisting of compost media, livestock manure, sewage sludge, and combinations thereof.

23. The an exchange medium of claim 22, wherein the partially decomposed organic matter is compost media.

24. The ion exchange medium of claim 23, wherein the compost media is selected from the group consisting of leaf compost media, peat, plant by-products, and combinations thereof.

25. The ion exchange medium of claim 24, wherein the compost media is leaf compost media.

26. The ion exchange medium of claim 25, wherein the compost media is peat.

* * * * *